(12) United States Patent
Guo et al.

(10) Patent No.: US 10,447,546 B1
(45) Date of Patent: Oct. 15, 2019

(54) CUSTOMIZED VISUALIZATIONS FOR DATA CENTERS

(71) Applicant: EMC Corporation, Hopkinton, MA (US)

(72) Inventors: Xiaoyan Guo, Beijing (CN); Yu Cao, Beijing (CN); Simon Tao, Shanghai (CN); Kenneth Durazzo, San Ramon, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 673 days.

(21) Appl. No.: 14/748,556

(22) Filed: Jun. 24, 2015

(51) Int. Cl.
| | |
|---|---|
| *H04L 12/28* | (2006.01) |
| *H04L 12/24* | (2006.01) |
| *G06F 3/0482* | (2013.01) |
| *G06F 3/0484* | (2013.01) |

(52) U.S. Cl.
CPC ............ *H04L 41/12* (2013.01); *G06F 3/0482* (2013.01); *G06F 3/04842* (2013.01)

(58) Field of Classification Search
CPC ........ H04L 41/22; H04L 43/045; H04L 43/04
See application file for complete search history.

(56) References Cited

U.S. PATENT DOCUMENTS

| | | | | |
|---|---|---|---|---|
| 2006/0085434 A1* | 4/2006 | Mah | .................... | G06F 17/3089 |
| 2011/0016342 A1* | 1/2011 | Rowan | ................ | G06F 11/3006 713/340 |
| 2012/0123989 A1* | 5/2012 | Yu | ...................... | G06Q 10/0639 706/47 |
| 2013/0198637 A1* | 8/2013 | Childers, Jr. | ....... | H04L 41/5032 715/735 |
| 2013/0232240 A1* | 9/2013 | Purusothaman | ...... | H04L 43/045 709/220 |
| 2013/0246130 A1* | 9/2013 | Michel | ................. | G06Q 10/067 705/7.36 |
| 2014/0129969 A1* | 5/2014 | Chasman | .............. | G06F 3/0486 715/769 |
| 2016/0080240 A1* | 3/2016 | Matthews | ............... | H04L 43/10 370/250 |

OTHER PUBLICATIONS

Jenifer Tidwell, "Designing Interfaces, 2nd Edition", Pub. Date: Dec. 30, 2010, O'Reilly Media, Inc. Pub. Date: Dec. 30, 2010, Dashboard section. (Year: 2010).*

* cited by examiner

*Primary Examiner* — Tan H Tran
(74) *Attorney, Agent, or Firm* — Ryan, Mason & Lewis, LLP

(57) ABSTRACT

A specification of visualization requirements for a customized visualization associated with one or more storage, compute and networking resources of a data center is generated. Resource data is obtained from one or more data sources, the resource data being associated with one or more of the storage, compute and networking resources of the data center. One or more data views are created utilizing the resource data, each data view comprising a dynamic mapping of the resource data based on the visualization requirements. One or more visuals are rendered utilizing the one or more data views. The customized visualization is generated by organizing the visuals into one or more dashboards of a graphical user interface.

19 Claims, 13 Drawing Sheets

100

300

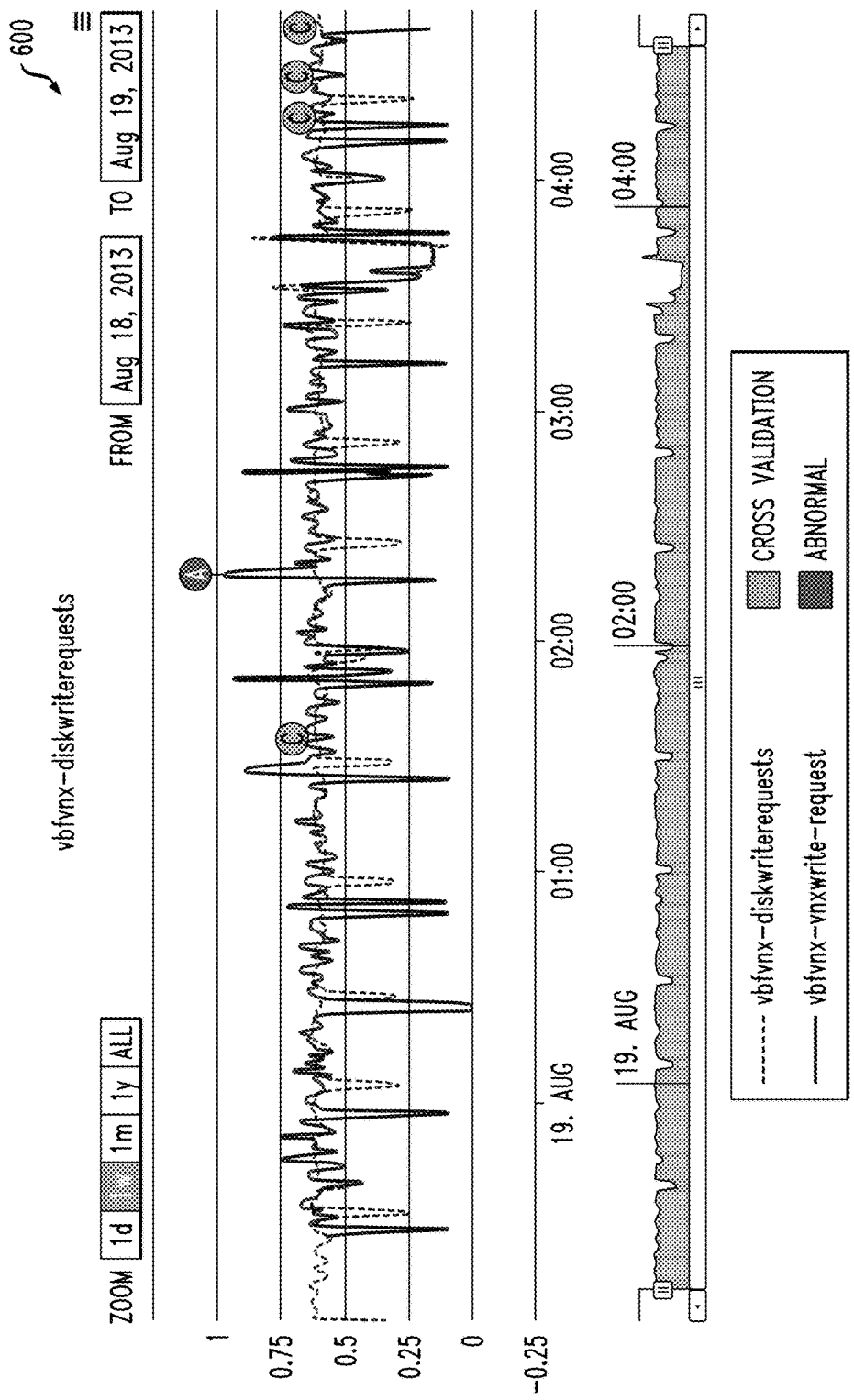
FIG. 6 cont.1

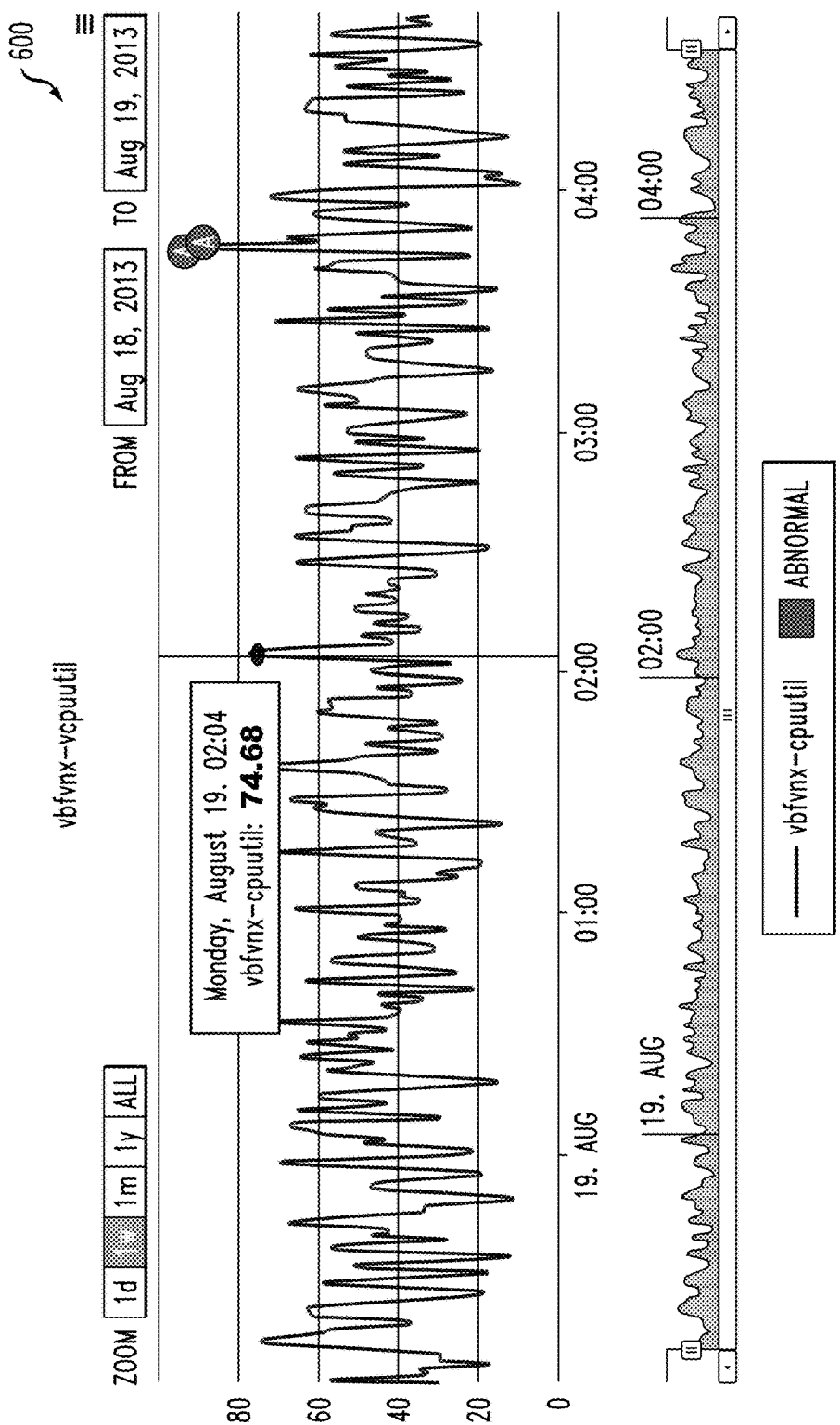
FIG. 6 cont.2

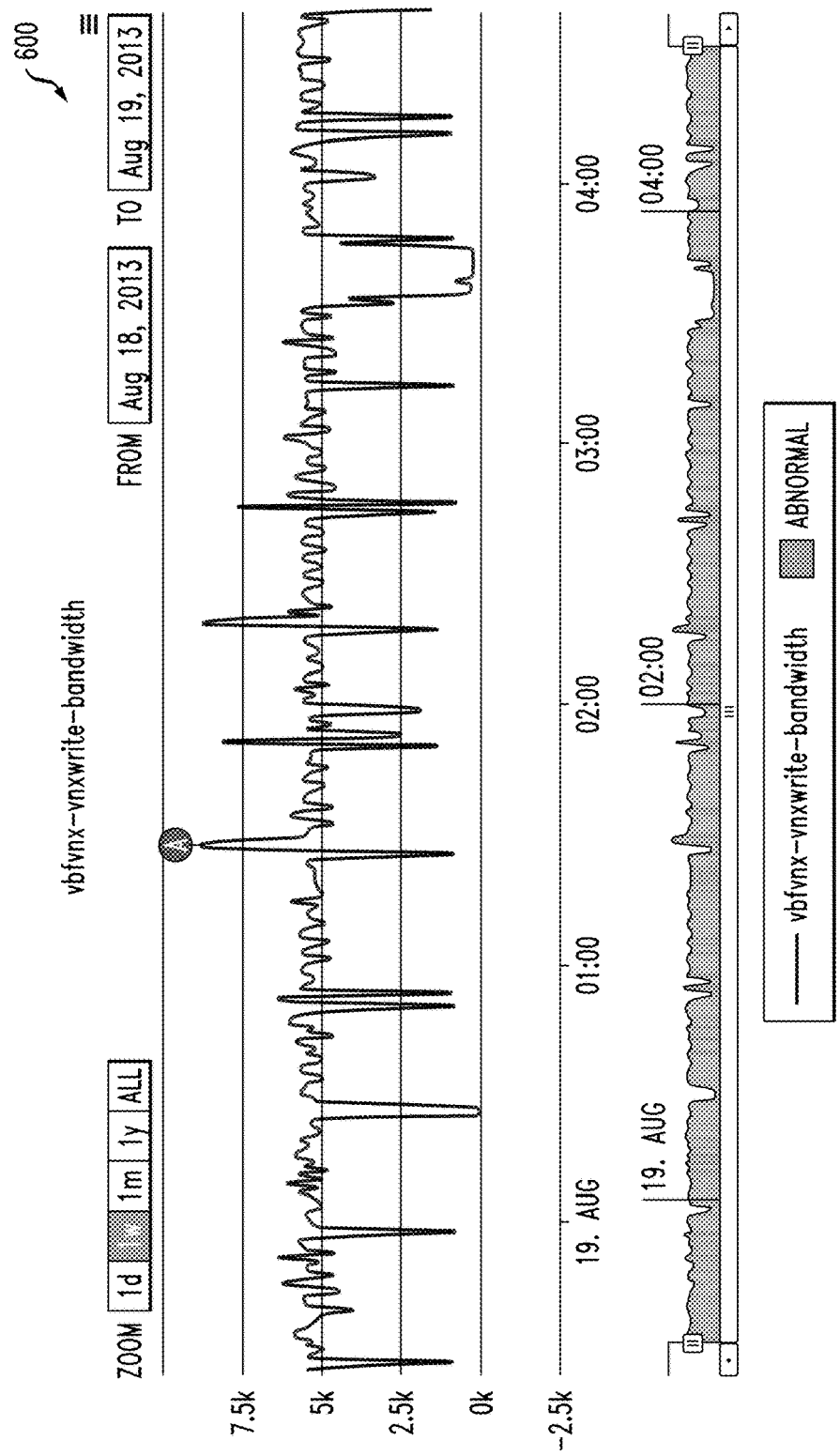
FIG. 6 cont.3

CUSTOMIZED VISUALIZATIONS FOR DATA CENTERS

FIELD

The field relates generally to computing environments, and more particularly to management in such computing environments.

BACKGROUND

A software-defined data center (SDDC) is a computing system wherein elements of the infrastructure, e.g., networking, storage, compute, etc., are virtualized and delivered to tenants (customers) of the data center as services. An SDDC is typically implemented in a cloud computing platform environment and the virtualized and delivered components are controlled through an Infrastructure-as-a-Service (IaaS) layer.

Various components in an SDDC expose management features via different monitoring tools. Such monitoring tools may be associated with different layers or portions of the SDDC. Some monitoring tools provide built-in monitoring and management dashboards with data visualization features.

SUMMARY

Embodiments of the invention provide techniques for customizable data visualization in a computing environment.

For example, in one embodiment, a method comprises the following steps. A specification of visualization requirements for a customized visualization associated with one or more storage, compute and networking resources of a data center is generated. Resource data is obtained from one or more data sources, the resource data being associated with one or more of the storage, compute and networking resources of the data center. One or more data views are created utilizing the resource data, each data view comprising a dynamic mapping of the resource data based on the visualization requirements. One or more visuals are rendered utilizing the one or more data views. The customized visualization is generated by organizing the visuals into one or more dashboards of a graphical user interface. The method is performed by one or more processing devices each comprising a processor operatively coupled to a memory.

Advantageously, illustrative embodiments provide techniques for flexible and customizable data visualization with a framework providing abstraction and modular design, improving user experience and reducing time, costs and efforts for system development. While the techniques are applicable to a wide range of computing systems, illustrative embodiments are implemented with an SDDC infrastructure.

These and other features and advantages of the invention will become more readily apparent from the accompanying drawings and the following detailed description.

DETAILED DESCRIPTION

Figure 1:
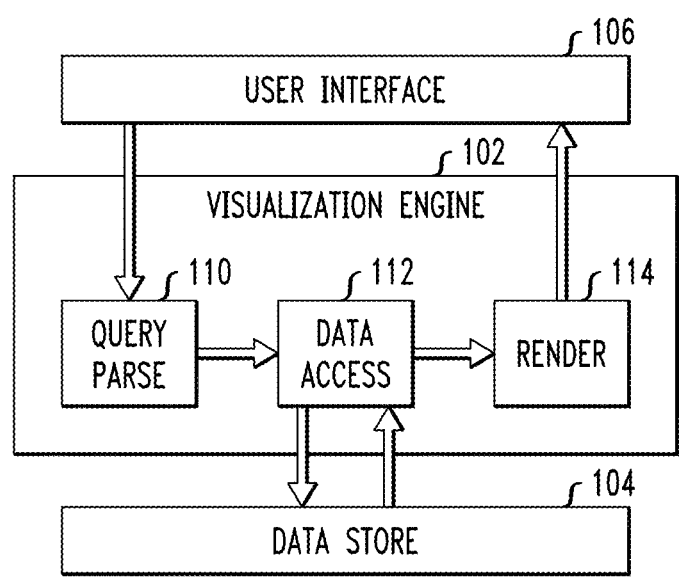
FIG. 1 illustrates a visualization system, according to an embodiment of the invention.

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

It is realized herein that system monitoring is a demanding task in an IaaS environment because of the inherent complexity from the underlying infrastructure. Multi-tenancy imposes further challenges in effective and efficient monitoring for such environments where high agility and scalability become important characteristics. Data visualization is an important and demanding task for monitoring and management of next-generation data centers such as hybrid cloud computing environments, converged infrastructure and SDDCs. Traditional visualization systems, however, are not capable and flexible enough to manage huge underlying data center resources and satisfy the diverse visualization requirements from large numbers of users.

Data visualization is important for efficiently monitoring and managing complex computing environments. System administrators and end-users such as tenants of a data center can monitor and understand resource allocation and usage through visualization of monitoring, reporting and analytics results for resources in data centers. Visualizations allow system administrators and end-users to more easily and accurately make decisions for system management, and thus improve the overall usability of data centers. Various types of visualizations are useful for data centers. For example, monitoring and visualizing the health status of storage devices in real-time, constantly visualizing the power and temperature of storage and other devices in a data center and live demonstration of the usage and capacity of each node or other resources in the data center can be useful for system administrators and end-users.

Various monitoring tools are available for use in monitoring portions of a data center. Examples of monitoring tools include, by way of example, EMC Storage Resource Management (SRM) Suite/Watch4Net and RSA Security Analytics (SA). Some monitoring tools provide features for data visualization. For example, EMC SRM provides ViPR SRM allowing for visualization of storage relationships in traditional and software-defined storage environments. ViPR SRM may be utilized to obtain detailed relationship and topology views from virtual or physical hosts down to the logical unit (LUN) number to identify application-to-storage dependencies. Performance trends across data paths may also be used to understand the impact that storage has on applications running in a data center. As another example, RSA SA can be used with NetWitness for monitoring network security. In addition to such monitoring tools, individual products such as individual storage arrays, hosts, servers, routers, switches, etc. may have built-in monitoring and management dashboards with data visualization features. Various other monitoring tools may be used in data centers, including by way of example OpenStack Ceilometer, EMC VNX Analyzer, Nagios, Zenoss, Splunk, etc.

Existing monitoring tools, however, are not sufficiently capable and flexible enough to adapt and address the diverse visualization requirements in complex computing environments such as hybrid cloud computing environments, SDDCs and converged infrastructure. These complex computing environments typically have a large number of users with diverse visualization requirements, and huge amounts of resources need to be visualized. As a result, a flexible and customizable visualization framework which can be open to a large number of end-users to construct their own visualizations according to their own individual requirements is needed.

Data centers in new cloud and converged environments, including SDDCs, bring new requirements and new challenges that existing visualization systems and tools do not adequately address. The exhibition system and graphical user interfaces (GUIs) in traditional data center visualization systems and tools are typically determined by vendors or service providers. Although some tools allow users to change themes and minor aspects of the content of a visualization GUI, such tools do not allow a user to change the nature of the visualization contents, layout or look and feel. Hence, such systems and tools are not able to satisfy diverse visualization requirements of next-generation data centers such as hybrid cloud computing environments, converged infrastructure and SDDCs.

Traditional visualization systems and tools are typically designed for use by system administrators, and thus the fixed GUI and contents exhibited in such systems are often tailored only to the needs of system administrators. However, the users of next-generation data centers such as hybrid cloud computing environments, converged infrastructure and SDDCs include tenants as well as system administrators. Tenants typically have different visualization requirements relative to system administrators. As a result, "one-size-fits-all" visualization systems may not be suitable for such environments. Different types of users may expect personalized visualizations so that individual users can focus visualizations on the information and resources that they are interested in.

Generic customization interfaces are also not typically designed or built into traditional visualization systems. Hence it is hard and inconvenient to allow users to customize such systems according to their requirements and preferences. In order to satisfy most requirements of the end-users, the data center vendors must devote significant effort, time and resources to investigate and implement such diverse requirements on an individual basis. In some cases, satisfying the diverse requirements necessitates system upgrades which affect system availability.

Visualization dashboards or views in traditional data center visualization systems are also typically fixed by the system developers. There is usually no way to change the dashboard layouts and themes. Allowing users to configure the layout of dashboards provides a number of advantages, allowing users to customize a dashboard for their particular needs. As an example, a user may wish to place two correlated figures or charts close to one another to allow for fast observation of relevant information and abnormal events.

Data center vendors typically define the data sources which may be used in traditional data center visualization systems. The number of data sources is usually fixed and cannot be changed by an end-user. Different users, however, have different monitoring and visualization needs and requirements and may wish to change the parameters of certain data sources, as well as add or remove data source instances for different dashboards. Traditional visualization systems, however, do not provide mechanisms which allow users to configure data sources to be visualized, nor do such systems provide corresponding interfaces for editing and configuring data sources or adding or removing data source instances to a visualization system.

In addition to the lack of customization for data sources, traditional data centers typically lack any mechanism for customizing the way in which a visualization is presented. As an example, different types of users may have different focuses or visualization needs for the same type of storage resources. While administrators may focus on overall system topology, performance, utilization and bottlenecks, tenants of a data center may focus on the utilization of just their own resources. It would be advantageous to allow users to tailor the perspective of a visualization for their particular requirements. As discussed above, however, traditional data center visualization systems often have only one perspective, i.e. a system administrator oriented perspective. The visualization dashboards of such systems typically exhibit contents which are useful primarily for system administrators, and do not allow users to choose the visualized data and the visualization structure. Mechanisms for building and customizing different visualization perspectives are needed to satisfy the diverse requirements of different types of users in a data center.

In order to overcome the above and other drawbacks with conventional visualization system approaches, illustrative embodiments provide a framework for building customizable data visualizations for complex computing environments such as SDDCs, cloud computing environments and converged infrastructure. Various embodiments provide a visualization framework with abstraction and modular design, generic visualization workflows, customization mechanisms for building user-defined dashboards and unified customization interfaces for system configuration. By allowing end-users to define and customize the visualization dashboards by themselves, various embodiments improve reusability, flexibility and user friendliness of data visualization systems and hence improve user experience. In addition, by granting permissions to users to manage the visualization system, embodiments can reduce time, cost and efforts of system development for data center vendors and service providers.

FIG. 1 illustrates a visualization system 100. The system 100 may be a generic framework which separates a visualization engine 102 from the data to be visualized. The visualization engine 102 is not dependent on the corresponding resource data to be visualized, but instead may be used to create and construct varied data visualizations using different types of data sets. Different users can thus build their own visualizations and dashboards from scratch.

The system 100 includes the visualization engine 102, a data store 104 and a user interface 106. In the system 100, each of the visualization engine 102, data store 104 and user interface 106 provides input and output interfaces to one other allowing for the exchange and transformation of data.

Visualization engine 102 receives visualization requirements from the user interface 106, and generates corresponding visualization results. As shown in FIG. 1, the visualization engine 102 includes query parsing component 110, data access component 112 and rendering component 114. The query parsing component 110 parses visualization queries from the user interface 106 and generates corresponding execution plans. The data access component 112 retrieves and obtains relevant data from the data store 104 according to the execution plans. The rendering component 114 renders visuals and assembles dashboards using the retrieved data. Data store 104 stores and manages data for the system 100. The user interface 106 is an intermediate layer between end-users and the visualization engine 102. The user interface 106 translates requests for customized visualizations received from users into an abstraction language that the visualization engine 102 understands.

Figure 2:
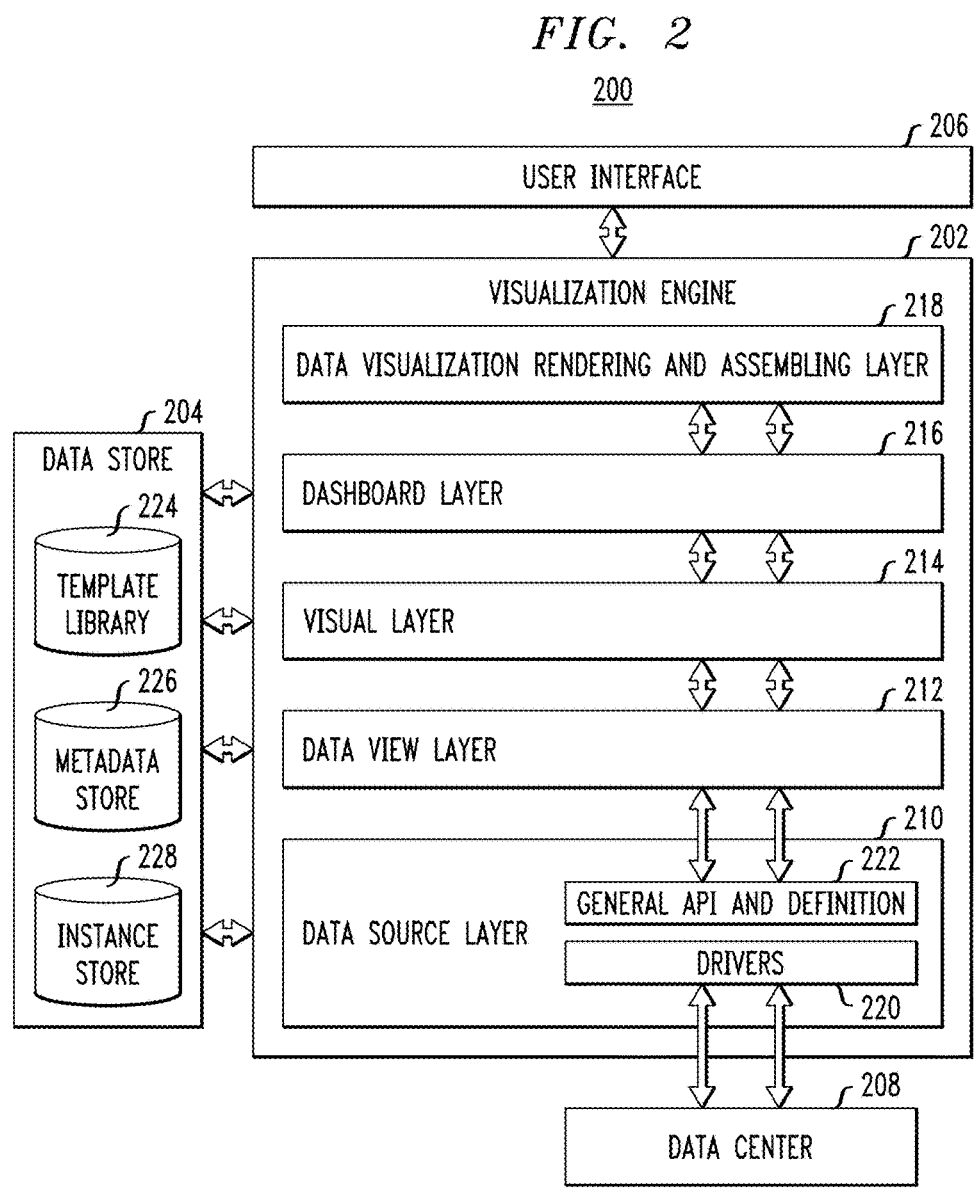
FIG. 2 illustrates another visualization system, according to an embodiment of the invention.

FIG. 2 shows a visualization system 200, including visualization engine 202, data store 204, user interface 206 and data center 208. In this embodiment, the visualization engine 202 comprises a hierarchical layered stack including a data source layer 210, a data view layer 212, a visual layer 214, a dashboard layer 216 and a data visualization rendering and assembling layer 218.

Data source layer 210 includes drivers 220 and a general application programming interface (API) and definition component 222. The drivers 220 gather information from storage, compute and networking resources of the data center 208. The general API and definition component 222 formats the gathered information into suitable formats for use by the data source layer 210. The data source layer 210 thus gathers the resource data from data center 208 to be visualized and also specifies data format and configuration parameters for different data sources. As an example, resource data to be visualized may include performance data for different LUNs or other storage components in the data center 208, performance data for virtual machines (VMs) or other compute components in the data center 208 and network traffic performance data for routers, switches or other networking components in the data center 208.

The data center 208 may be, by way of example, a SDDC. A SDDC may include an IaaS layer, which itself comprises networking components (e.g., routers, switches, etc.), compute components (e.g., servers, hosts, etc.) and storage components (e.g., storage arrays, storage devices, etc.). By way of example only, the IaaS layer of a SDDC such as data center 208 may be implemented using OpenStack. As is known, OpenStack is a software platform that controls pools of compute, storage, and networking resources throughout a data center, managed through a dashboard or via the OpenStack application programming interface (API). OpenStack operates with enterprise and open source technologies enabling use with a wide variety of heterogeneous infrastructure components. Examples of storage components may include, but are not limited to, VNX, VPLEX and Isilon storage systems (commercially available from EMC Corporation, Hopkinton, Mass.).

Data view layer 212 creates data mappings for raw data collected from the different data source instances from the data source layer 210. For different visualization requirements, raw data may be used in different ways. As such, different data views can be dynamically created to adapt to different upper-layer visualization requirements in the hierarchical layered stack of the visualization engine 202. For example, a customized visualization may seek to visualize time traces for utilization of different storage, compute and networking resources in the data center 208. A customized visualization may alternately seek to depict mapping relationships for storage, compute and networking resources utilized by a tenant or group of tenants of the data center 208. Different data mappings may be used for such varied visualization requirements, including utilizing different data mappings for a same underlying data source for two or more different visuals.

Visual layer 214 renders visuals using different data view instances from the data view layer 212. Each visual is used to exhibit the nature of underlying data for at least one data view instance. Visuals include, by way of example, charts and graphs including infographics, dials and gauges, geographic maps, sparklines, heat maps, detailed bar, pie and fever charts, etc.

Dashboard layer 216 is used to create dashboard instances using various visual instances rendered in the visual layer 214. A dashboard is a view of a user interface for organizing and presenting information. As an example, a dashboard may be a collection of one or more visuals and optional text descriptions for such visuals. Dashboards can be interactive, providing different tabs, sliders, buttons, etc. allowing users to interact with different visuals to assist in managing data center 208. Various examples of dashboards will be described below in conjunction with FIGS. 5-9.

In each layer of the visualization engine 202, the visualization engine 202 constructs required elements and stores instances in the data store 204. Upper-level layers in the hierarchical layered stack of the visualization engine 202 obtain instances generated by lower levels of the hierarchical layered stack and generate their own instances according to specified visualization requirements.

The data visualization rendering and assembling layer 218 aggregates and renders final visualization results and assembles the results and passes them for exhibition via a GUI for users to access. The user interface 206 may provide this GUI.

The visualization engine 202 may thus generate a customized visualization utilizing the hierarchical layered stack shown in FIG. 2 by obtaining and collecting raw data from data sources utilizing data source layer 210, creating data views on top of the raw data utilizing data view layer 212, rendering different visuals for each data view utilizing the visual layer 214, choosing and assembling visuals into one or more dashboards utilizing the dashboard layer 216 and setting up the customized visualization with the created dashboards utilizing the data visualization rendering and assembling layer 218.

Data store 204 stores and manages data for the system 200. In the FIG. 2 embodiment, the data store 204 stores data in a template library 224, a metadata store 226 and an instance store 228. Template library 224 stores various templates to allow users to quickly build a customized visualization. Templates include visualization templates, dashboard templates, visual templates, data view templates and data source templates. An existing dashboard template may be used as a basis for organizing the visuals for a new dashboard. Similarly, existing visualization, visual, data view and data source templates may be used for customizing a new visualization, visual, data view or data source. When new visualizations, dashboards, visuals, data view and data sources are created, an option may be given to a user to save the new visualization, dashboard, visual, data view or data source as a new template in the template library 224. Metadata store 226 includes type definitions for different visualization items, including data source definitions, data view definitions, visual definitions, dashboard definitions and visualization definitions. Instance store 228 stores instances generated by the different layers of the visualization engine, including data source instances, data view instances or materializations, visual instances, dashboard instances and visualization instances.

A visualization may be represented as a hierarchical tree structure of dashboards, visuals, data views and data sources. A visualization generally may include one or multiple dashboards, with each dashboard including one or multiple visuals, where each visual is a graphical representation of at least one data view and each data view maps one or multiple data sources into a single data view.

Figure 3:
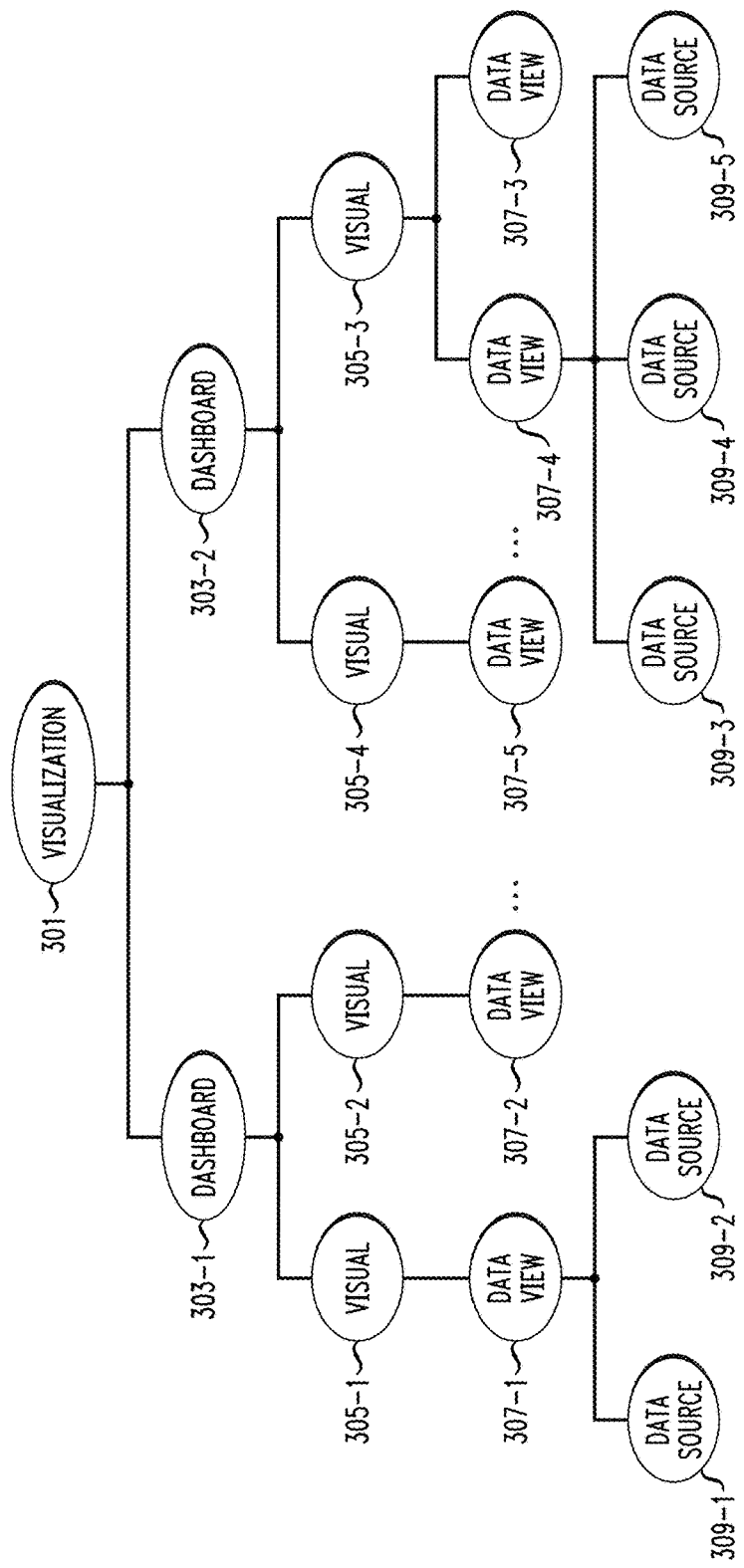
FIG. 3 illustrates a hierarchical tree structure for a visualization system, according to an embodiment of the invention.

FIG. 3 shows an example hierarchical tree structure 300 of a visualization 301. The visualization 301 includes two dashboards 303-1 and 303-2. Dashboard 303-1 includes visuals 305-1 and 305-2, while dashboard 303-2 includes visuals 305-3 and 305-4. Visual 305-1 is a graphical representation of data view 307-1, which maps data sources 309-1 and 309-2. Visual 305-2 is a graphical representation of data view 307-2, which itself maps a number of data sources (not shown in FIG. 3). Visual 305-3 is a graphical representation of data views 307-3 and 307-4. Data view 703 maps at least one data source (not shown in FIG. 3), and data view 307-4 maps data sources 309-3, 309-4 and 309-5. Visual 305-4 is a graphical representation of data view 307-5, which maps a number of data sources (not shown in FIG. 3).

The visualization engine 102 in system 100 or the visualization engine 202 in system 200, utilizing various layers described above, may generate a customized visualization by using a hierarchical tree structure such as the tree structure 300 described above. In some embodiments, the user interface 106 in system 100 or the user interface 206 in system 200 provides a topology drawing tool allowing a user to create or build a hierarchical tree structure for a customized visualization according to that user's individual visualization requirements. Users can select which data will be exhibited in a GUI, as well as the relationships between different data elements. Once a user has built the tree structure, the visualization engine 102 in system 100 or the visualization engine 202 in system 200 can parse the tree structure to generate a customized visualization.

Figure 4:
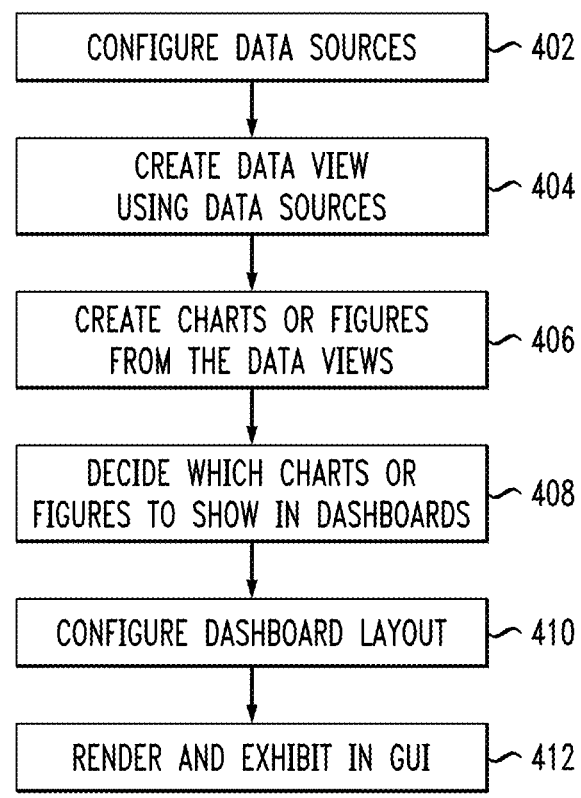
FIG. 4 illustrates a methodology for creating a customized visualization, according to an embodiment of the invention.

FIG. 4 shows a workflow 400 which may be utilized for generating a customized visualization in some embodiments. The workflow 400 begins with step 402, configuring data sources for a customized visualization. In step 404, data views are created using the configured data sources. In step 406, charts or figures are created from the data views. The charts or figure are examples of visuals. In some embodiments step 406 may include creating or rendering other types of visuals in addition to or in place of charts and figures. A decision is made as to which charts, figures and other visuals to show in particular dashboards in step 408. In step 410, the dashboard layout is configured. Step 410 may include selecting themes for dashboards. The customized visualization is rendered and exhibited in a GUI in step 412.

In some embodiments the user interface 106 of system 100 or the user interface 206 of system 200 may provide various customization mechanisms allowing users to build custom, user-defined visualizations, dashboards, visuals, data views and data sources according to their own individual requirements and demands.

As discussed above, the data store 204 may include a template library 224 including various visualization templates. By using a template, a user can quickly build a customized visualization. For each element of the visualization, e.g., for each dashboard, visual, data view, data source, etc. there can be rich templates stored in the template library 224. In some embodiments, building a customized visualization starts with selecting an appropriate template or templates from the template library 224. Once a customized visualization is generated, it may be saved as a new template in the template library 224. Similarly, when new dashboards, visuals, etc. are created they may be stored as new templates in the template library 224.

The template library 224 may store various data visualization templates for data centers such as SDDCs, cloud computing environments or converged infrastructure. Such visualization templates may include, by way of example, a realistic three-dimensional visualization of a data center with one or multiple floors populated with racks of servers hosting storage, compute and networking components of the data center. As another example, a visualization template may include a visualization of resource mapping and topology in the data center. The resource mapping may include any combination of storage, compute and networking components in the data center. As a further example, a visualization template may be for dynamic monitoring of the power, temperature or other status or performance characteristics of any combination of storage, compute and networking components in the data center.

The above-described templates may be customized for a particular user's needs. Consider, by way of example, a visualization template which shows resource mapping for all storage, compute and networking resources in a SDDC in a single dashboard view. A system administrator of the SDDC may prefer to have resource mapping separated into three dashboards—one for storage resources, one for compute resources and one for networking resources. A system administrator or tenant of the SDDC may alternatively desire a visualization blending only compute and storage resources, such as VM and LUN mappings. Another tenant may wish to view resource mapping for only those storage, compute and networking resources used by that tenant rather than all resources in the SDDC. Other tenants may have their own requirements for other types of customized visualizations.

In some embodiments, the user interface 106 or user interface 206 is designed to have an interactive and customizable GUI for users. The interactive GUI may have a drag-and-drop tool permitting a user to configure the layout of dashboards, visuals, etc. The drag-and-drop tool may, for example, permit a user to drag a given visual from a pool of available visuals to a desired location on a particular dashboard view of a visualization, or to rearrange the location of visuals in a dashboard template to suit that user's particular needs.

The user interface 106 or user interface 206 may also provide an interactive tool allowing a user to configure the appearance of a dashboard or visual, as well as elements thereof. Each element in a dashboard may expose various interfaces allowing a user to affect the appearance and behavior of that element. Users can configure such elements using the interactive tool via the exposed interfaces to define elements for placement on a dashboard view. Unified customization interfaces allow users to conveniently and quickly build customized dashboard views.

Each element may have a number of interfaces. For example, each visual element in a dashboard may have an interface for parameters and other configuration items, including data source definition, data formats, where to obtain data, data view mapping rules, visual types, visual axis, visual themes, the data source of each visual, whether the visual element should be shown or hidden in a given dashboard view, the size of the visual, etc. The dashboard itself may have various elements with interfaces for controlling dashboard layout, element positions and sizes within the dashboard, etc.

In some embodiments, the interactive tool can allow a user to change the dashboard appearance and interaction with underlying data center resources. The interactive tool can allow the user to sort, hide and reveal different elements in a dashboard or visual. For example, a dashboard template may contain two or more visuals, and the user may customize the template by only showing a subset of the visuals in the template. The interactive tool may also be configured to select or modify a theme for a dashboard. The theme may include various information, such as color schemes, fonts, icon types, naming, menus, tabs, entity-specific branding, etc. The interactive tool permits the user to filter elements and provide conditional formatting rules for elements in a dashboard or visual. This may include providing online and cross tab sorting, column move/hide, etc. Conditional formatting may include, by way of example, highlighting values which exceed designated thresholds, pinpointing duplicate values in a single column on the fly, showing normal and abnormal values with different colors, etc.

The interactive tool may also permit a user to edit the contents of a particular visual. For example, a visual template may track input/output (I/O) requests for a particular storage resource. A given user, however, may wish to track only input requests. As another example, a particular visual may show CPU utilization as a percentage view, as well as a time trace of CPU utilization. A given user, however, may wish to hide the percentage view but show the time trace, or vice versa. Various other examples are possible for these and other types of visuals.

Various details and examples of customization mechanisms will be described in further detail below with respect to the example dashboard views of FIGS. 5-9.

In some embodiments, a visualization may include multiple dashboards. As an example, a single customized visualization may be created for a group of tenants of an SDDC. This single customized visualization however, may include multiple dashboard views. The different dashboard views may be specific to different tenants of the SDDC. In some embodiments, the different dashboard views may be specific to different types of users. For example, a single visualization may include a dashboard view for a system administrator, as well as one or more additional dashboard views for specific tenants or groups of tenants of a data center. A single customized visualization may also include multiple dashboard views that are all associated with the same user, such as multiple views for a system administrator or multiple views for a particular tenant of a data center.

The various customization tools and mechanisms described herein allow for users to create visualizations with one or multiple dashboard views tailored for their specific needs. While various examples of customized visualizations are described below, embodiments are not limited solely to the particular customized visualizations shown, but are instead may generally include various types of visualizations of storage, compute and networking resources of a data center such as an SDDC.

Figure 5:
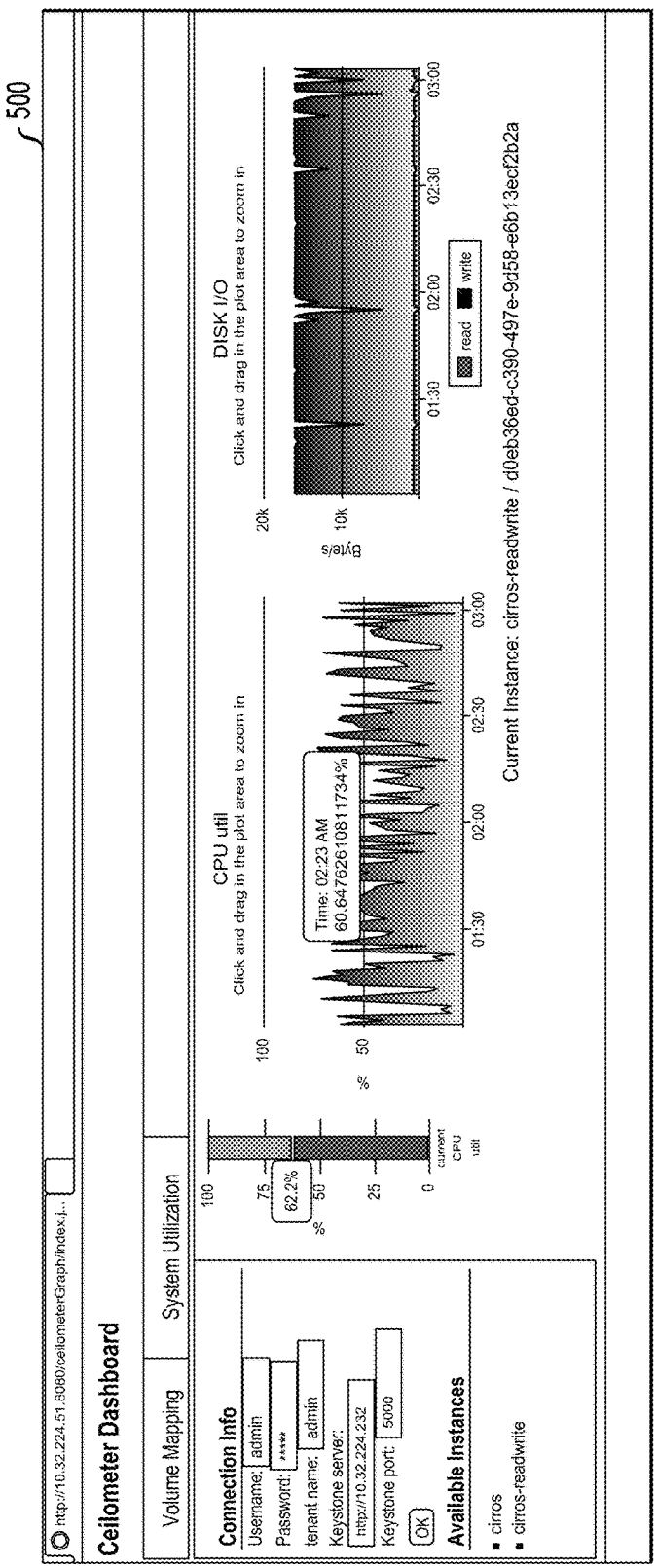
FIG. 5 illustrates a visualization of system resource utilization statistics for a virtual machine instance, according to an embodiment of the invention.

FIG. 5 shows a customized visualization 500 of resource utilization statistics for a specific VM instance. The customized visualization 500 is built for a particular tenant of a data center. The customized visualization 500 shows three visuals—a current CPU utilization percentage, a time trace of CPU utilization and a time trace of disk I/O operations. It will be appreciated, however, that various other visuals may be used for tracking resource utilization statistics. Other charts and graphs may be used to show network bandwidth utilization, latency, etc. as well as other information relating to CPU utilization and disk performance. As an example, a pie chart may be shown detailing the percentage of CPU utilization for different processes running in the VM instance.

Using customization mechanisms such as the interactive tool described above, a user can control the placement and size of the different visuals, the lengths of the time traces, the scale of the axis in the visuals, etc. The CPU utilization and disk I/O time traces also provide interfaces for zooming in on particular time periods by clicking and dragging on areas of the plots. The click and drag may be separate, in that each visual can be zoomed to different time periods. In other embodiments, a user can customize these visuals such that if the click and drag feature is used in one time trace to select a particular time period, the other time trace is automatically zoomed in to that same time period for comparison.

As further shown in FIG. 5, the customized visualization 500 allows for selection of different available VM instances in the bottom of the left-hand pane. Each VM instance may be considered as a different data source. The customized visualization 500 shows information for the selected VM instance cirros-readwrite, but as shown the cirros VM instance may alternately be shown by user interaction with the dashboard view. The customized visualization 500 also provides for security and access control for visuals or portions thereof by requiring a user to input information such as a username, password, tenant name, etc. in order to view the visuals for particular VM instances. In this manner, a customized visualization may be created which can be used for a group of users while allowing individual users in the group to track utilization of his or her own VM instances.

As discussed above, a given visual is built from at least one data view mapping raw data from one or more data sources. In some customized visualizations, the same data source is used to build different data views and thus different visuals for the same visualization. Consider, for example, the CPU utilization percentage and the CPU utilization time trace visuals in the customized visualization 500. These visuals may have the same data source (e.g., one or more compute resources in the data center). Raw data from the data source, however, may be formatted into two distinct data views to create the different visuals.

While FIG. 5 shows a customized visualization 500 which is specific to tracking utilization of VM instances, embodiments are not so limited. Various customized visualizations may be utilized to show resource utilization statistics for any combination of one or more storage, compute and networking resources of a data center utilized by one or multiple tenants of the data center.

Figure 6:
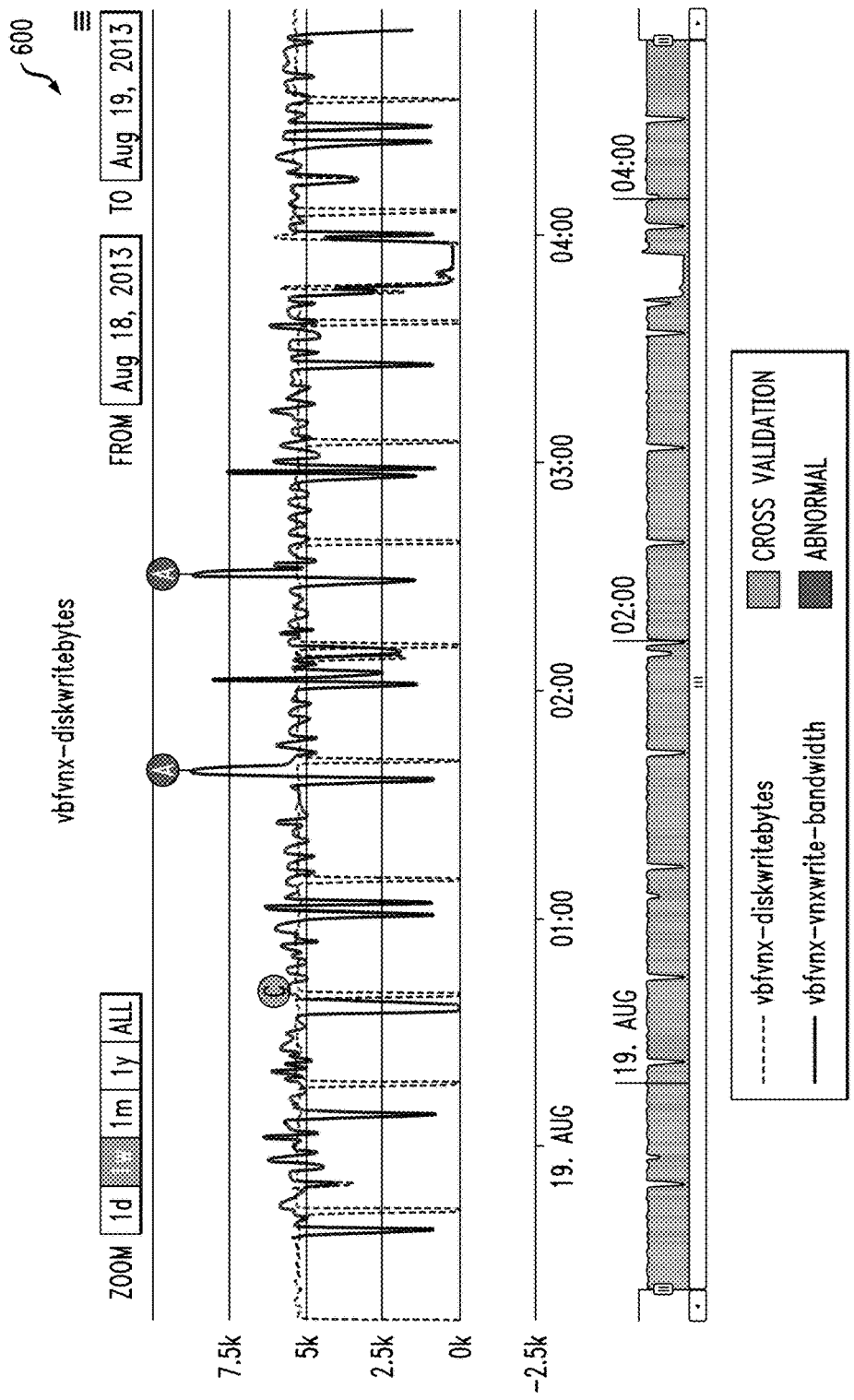
FIG. 6 illustrates a visualization of virtual machine performance, according to an embodiment of the invention.

FIG. 6 shows a customized visualization 600 of performance monitoring of a VM instance "vbfvnx." The customized visualization 600 may be built for a data center system administrator to track and check for abnormalities associated with the usage of the VM instance vbfvnx. In other embodiments, the customized visualization 600 may alternatively be used by a given tenant for a particular one of that tenant's VM instances, or for a system administrator or tenant to track multiple VM instances or other compute, storage or networking resources.

The customized visualization 600 includes four visuals for the VM instance vbfvnx—a disk write bytes time trace, a disk write requests time trace, a virtual CPU utilization time trace and a write bandwidth time trace. As shown, each visual may be zoomed to a different granularity, e.g., one day, one week, one month, one year or all available. As described above with respect to FIG. 5, the different visuals shown in customized visualization 600 may be linked or unlinked. By way of example, if the visuals are unlinked then the disk write bytes time trace may show one week of information while the disk write requests trace may show one month of information. If two or more visuals are linked, then changing the granularity for one of the visuals will also change the granularity for other visuals to which that visual is linked.

In the customized visualization 600, a user may modify the placement of the four visuals. For example, the virtual CPU utilization time trace visual may be switched with the disk write bytes visual. A user may wish to rearrange the visuals so as to make it easier to detect and track abnormalities and dependencies between different compute, storage and networking resources in a data center. As shown in the customized visualization 600, abnormal activity is highlighted in each of the four visuals by displaying an "A" at points in the graphs where resource utilization meets certain specified criteria for detecting an abnormality. As an example, abnormality detection may be based on resource utilization meeting or exceeding a certain threshold. An abnormality may also be detected utilizing multiple thresholds, as it may be abnormal in some cases for resource utilization to either drop below a low threshold or exceed a high threshold for some designated period of time. In some cases, a user may rearrange the visuals so that they are not in a two column by two row grid but are instead in a single column with four rows to more easily detect and see the relationship between abnormal events detected in different time traces.

Some of the visuals in FIG. 6 show cross validation events by marking cross validation events with a "C" in the plots. Cross validation events may be used to identify when two or more correlated metrics associated with particular compute, storage and networking components in a data center are not exhibiting their expected correlation relationships. For example, the disk write requests time trace visual in the customized visualization 600 plots measurements of vbfvnx-diskwriterequests and vbfvnx-vnxwrite-requests. The data sources for these two measurements may be associated with different monitoring tools used in the data center, such as OpenStack Ceilometer and VNX Analyzer. Domain knowledge may indicate that the values of these measurements or metrics should agree with one another. Cross validation events are highlighted in the disk write requests time trace visual when the values of the two measurements differ by more than a specified threshold.

Various customized visualizations may be utilized to show mapping relationships for compute, storage and networking resources in a data center. A customized visualization may show the mapping relationships for all compute, storage and network resources in the data center, for all compute, storage and networking resources in the data center used by a single tenant, for all compute, storage and networking resources in the data center used by a group of tenants, etc. In addition, a customized visualization may show mapping relationships for compute resources only, for storage resources only, for networking resources only, or for any combination of one or more compute, storage and networking resources used by a tenant, a group of tenants or all tenants in the data center.

Figure 7:
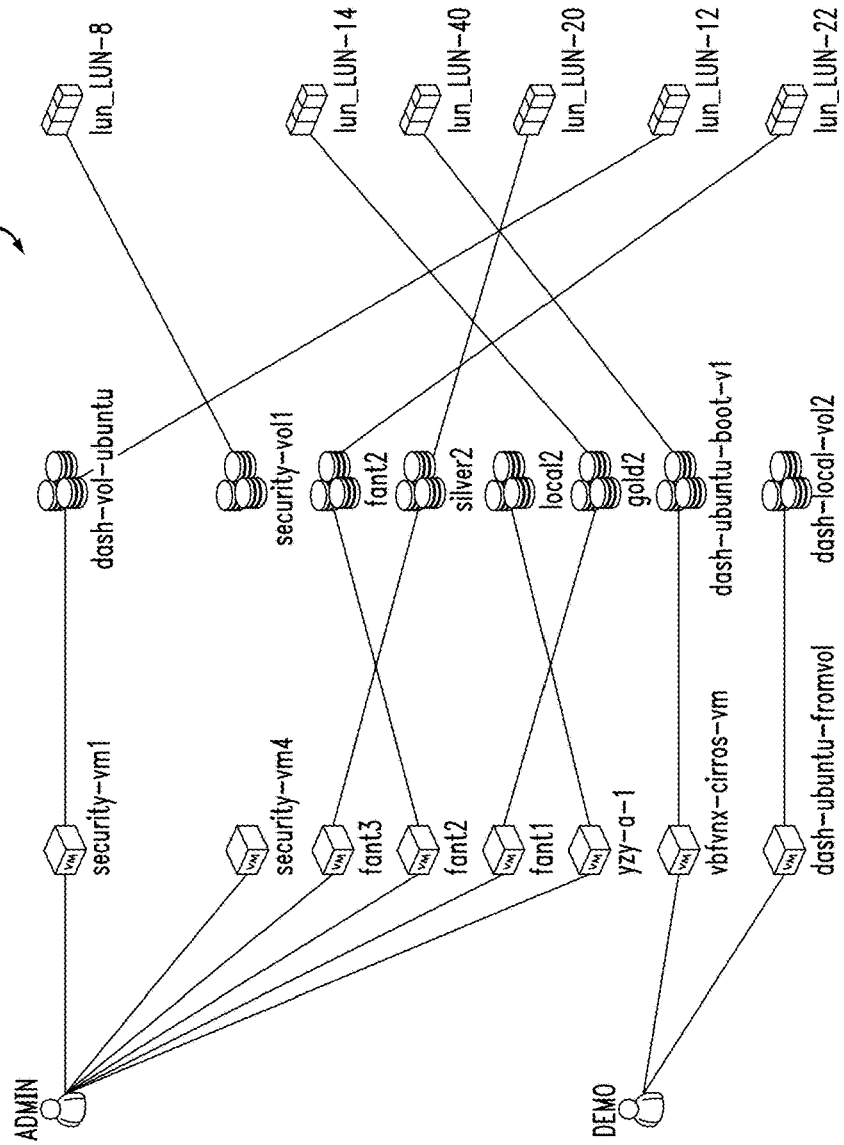
FIG. 7 illustrates a visualization of mapping relationships between tenants and resources of a computing environment, according to an embodiment of the invention.

FIG. 7 shows a customized visualization 700 of mapping relationships between tenant users and physical storage devices as well as mapping relationships between virtual volume and VM instances. The customized visualization 700 may be built for a system administrator seeking a view of all system resources in the data center. The customized visualization 700 includes two visuals. The first visual, shown in the left-hand pane, tabulates the number of tenants, hypervisors, VMs, volumes and LUNs in the data center as well as the particular number of VMs and volumes used by particular ones of the tenants. The second visual, shown in the right-hand pane, illustrates mappings between the tenants and specific VMs, volumes and LUNs.

In some embodiments, a customized visualization showing mapping relationships may show more, less or different information than the specific customized visualization 700 shown in FIG. 7. For example, a customized visualization may further illustrate mapping relationships for networking resources, or for only certain types of compute or storage resources, etc. In addition, a user may be permitted to customize the layout of the visuals. For example, instead of shown the tenants, VMs, volumes and LUNs as "columns" a customized visualization may show the tenants, VMs, volumes and LUNs as "rows." The particular icons and associated textual descriptions for the different tenants, VMs, volumes and LUNs can also be altered. In some instances, the relative sizes of the icons for the volumes or storage LUNs may be adjusted to reflect their actual storage capacity or other performance characteristics such as latency, I/O Operations Per Second (IOPS), throughput, etc.

Figure 8:
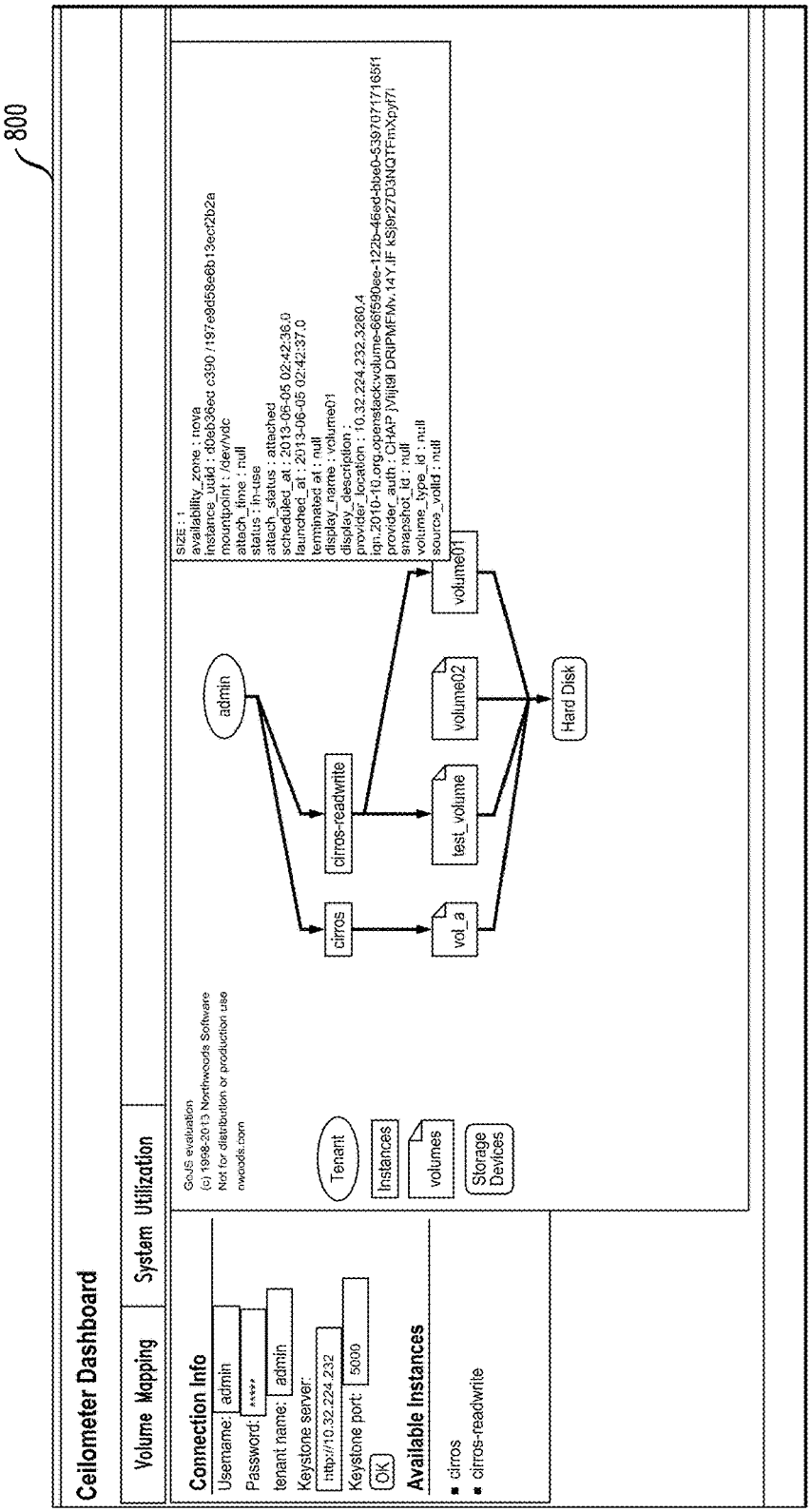
FIG. 8 illustrates a visualization of mapping relationship for resources utilized by a tenant of a computing environment, according to an embodiment of the invention.

FIG. 8 shows a customized visualization 800 of mapping relationships from a tenant perspective. In the customized visualization 800, the visual in the right-hand pane illustrates the mapping between tenants, VM instances, virtual volumes and underlying storage devices. In some embodiments, a customized visualization from the tenant perspective may only show the mappings for a single VM instance, or for more than two VM instances. In addition, various customization mechanisms such as the interactive tool allow for tailoring the customized visualization 800 according to different requirements. For example, the shapes, types and sizes of the icons for the tenant(s), VM instances, virtual volumes and underlying storage devices may be adjusted, as well as the amount and formatting of the textual description provided. Similar to the customized visualization 500 described above, the customized visualization 800 provides for security and access control by requiring the user to input information such as a username, password, tenant name, etc. in order to view the visual shown. In this manner, a single customized visualization may be created which can be used for a group of users which want to view their respective mappings of one or more compute, storage and networking resources in a data center.

Figure 9:
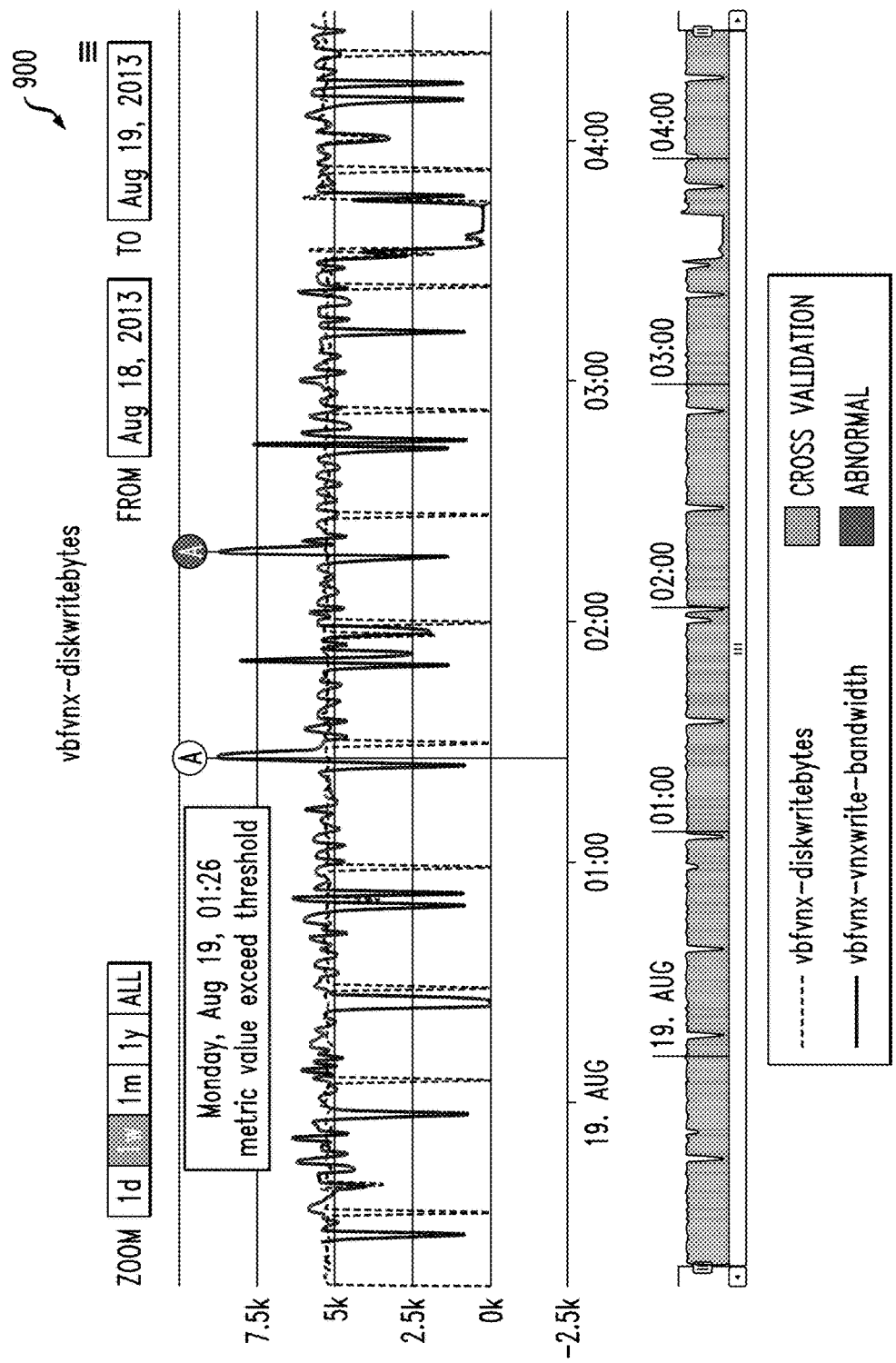
FIG. 9 illustrates a visualization of monitoring disk writes in a computing environment, according to an embodiment of the invention.

FIG. 9 shows a customized visualization 900 of monitoring for VNX disk write bytes. The customized visualization 900 also visualizes analytics results for detecting abnormalities, which is useful for alert generation and visualization of abnormal write patterns. Various customization mechanisms and interactive interfaces are provided in the customized visualization 900, including the particular metrics and thresholds for detecting and displaying abnormalities in the visual, the time range for the visual, the textual information provided in the visual, etc. In addition, the customized visualization 900 may permit dynamic configuration of the data sources to monitor. For example, the customized visualization 900 shows a time series trace including plots for disk write bytes (vbfvnx-diskwritebytes) as well as write bandwidth (vbfvnx-vnxwrite-bandwidth). A customized visualization can include interfaces for adding or removing other plots for this visual, such as disk read bytes, disk read bandwidth, etc. In some embodiments, the visual may be dynamically updated to show or remove such plots via check boxes, buttons, sliders or other interface mechanisms.

Figure 10:
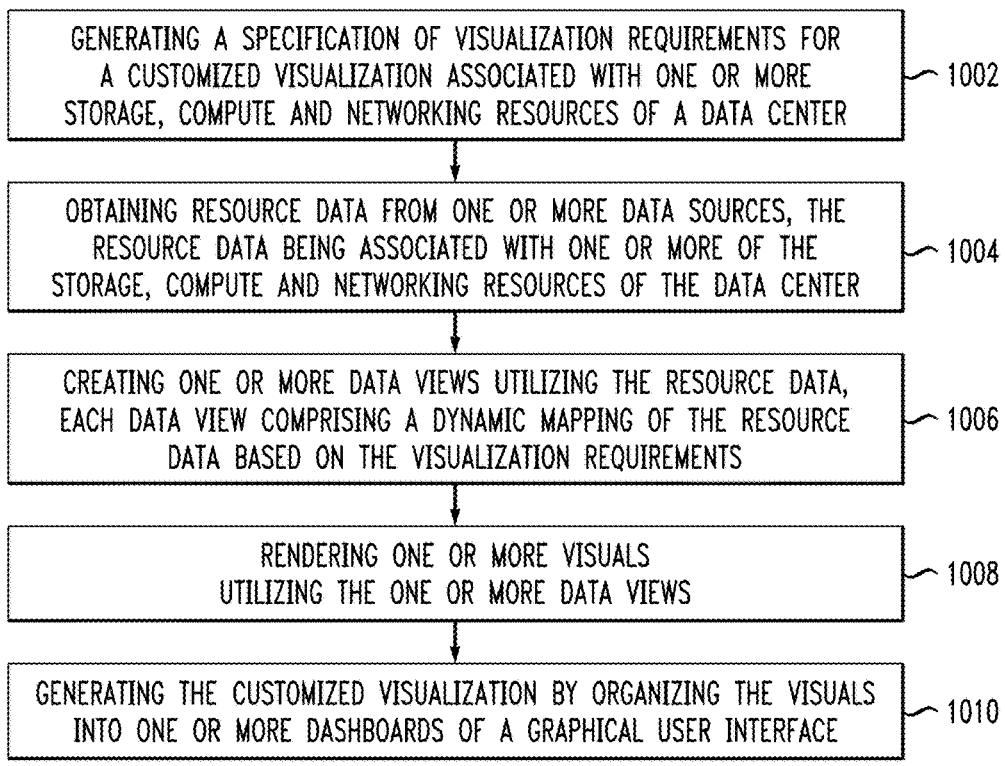
FIG. 10 illustrates a methodology for visualization, according to an embodiment of the invention.

FIG. 10 illustrates a methodology 1000 for generating a customized visualization, according to an embodiment of the invention.

As shown in step 1002, a specification of visualization requirements for a customized visualization associated with one or more storage, compute and networking resources of a data center is generated.

In step 1004, resource data is obtained from one or more data sources, where the resource data is associated with one or more of the storage, compute and networking resources of the data center.

In step 1006, one or more data views are created utilizing the resource data, where each data view comprises a dynamic mapping of the resource data based on the visualization requirements.

In step 1008, one or more visuals are rendered utilizing the one or more data views.

The customized visualization is generated in step 1010 by organizing the visuals into one or more dashboards of a graphical user interface.

Figure 11:
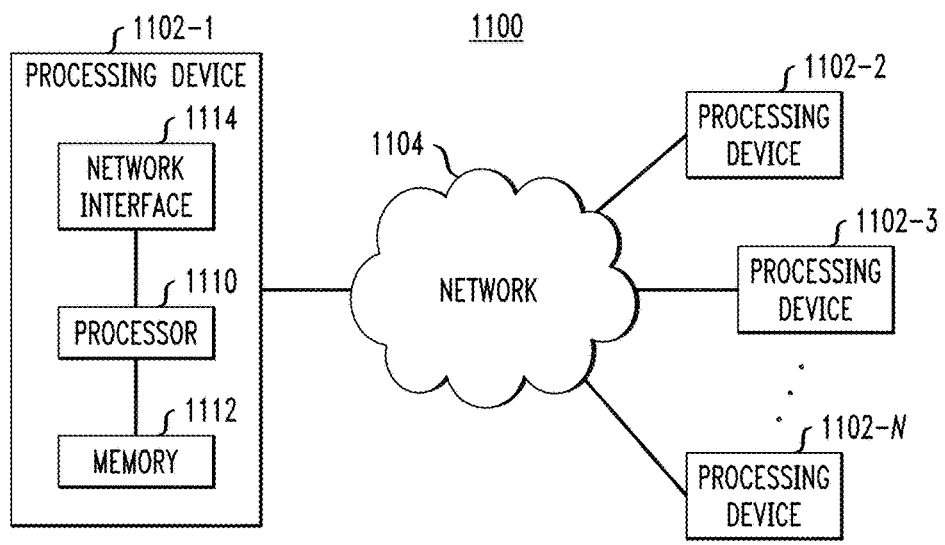
FIG. 11 illustrates a processing platform used to implement a visualization system, according to an embodiment of the invention.

An example of a processing platform on which a visualization system (e.g., the system 100 of FIG. 1 and the system 200 of FIG. 2) can be implemented is processing platform 1100 shown in FIG. 11. The processing platform 1100 in this embodiment comprises a plurality of processing devices, denoted 1102-1, 1102-2, 1102-3, . . . 1102-N, which communicate with one another over a network 1104. It is to be appreciated that the methodologies described herein may be executed in one such processing device 1102, or executed in a distributed manner across two or more such processing devices 1102. It is to be further appreciated that a server, a client device, a computing device or any other processing platform element may be viewed as an example of what is more generally referred to herein as a "processing device." As illustrated in FIG. 11, such a device generally comprises at least one processor and an associated memory, and implements one or more functional modules for instantiating and/or controlling features of systems and methodologies described herein. Multiple elements or modules may be implemented by a single processing device in a given embodiment.

The processing device 1102-1 in the processing platform 1100 comprises a processor 1110 coupled to a memory 1112. The processor 1110 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1110. Memory 1112 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1112 may comprise electronic memory such as random access memory (RAM), read-only memory (ROM) or other types of memory, in any combination. The one or more software programs when executed by a processing device such as the processing device 1102-1 causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1102-1 also includes network interface circuitry 1114, which is used to interface the device with the network 1104 and other system components. Such circuitry may comprise conventional transceivers of a type well known in the art.

The other processing devices 1102 (1102-2, 1102-3, . . . 11024) of the processing platform 1100 are assumed to be configured in a manner similar to that shown for computing device 1102-1 in the figure.

The processing platform 1100 shown in FIG. 11 may comprise additional known components such as batch processing systems, parallel processing systems, physical machines, virtual machines, virtual switches, storage volumes, etc. Again, the particular processing platform shown in this figure is presented by way of example only, and the visualization systems 100 and 200 shown in FIGS. 1 and 2, respectively, may include additional or alternative processing platforms, as well as numerous distinct processing platforms in any combination.

Also, numerous other arrangements of servers, clients, computers, storage devices or other components are possible in processing platform 1100. Such components can communicate with other elements of the processing platform 1100 over any type of network, such as a wide area network (WAN), a local area network (LAN), a satellite network, a telephone or cable network, or various portions or combinations of these and other types of networks.

Furthermore, it is to be appreciated that the processing platform 1100 of FIG. 11 can comprise VMs implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1100 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 1100 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and Symmetrix VMAX (commercially available from EMC Corporation, Hopkinton, Mass.). A variety of other computing and storage products may be utilized to implement the one or more services that provide the functionality and features described herein.

It was noted above that portions of the systems 100 and 200 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
in a computing environment comprising a data center operatively coupled to a first processing device, and one or more user processing devices operatively coupled to the first processing device;
generating, via the first processing device, a specification of visualization requirements for a customized visualization associated with one or more storage, compute and networking resources of the data center, wherein the specification generation step further comprises the first processing device receiving from the one or more user processing devices visualization requirements specific to each of one of more users for a given customized visualization, and further wherein the generation of visualization requirements comprises enabling use of a topology generator by at least one of the one or more user processing devices through a user interface associated with the first processing device to generate a user-definable hierarchical structure representing a topology of one or more dashboards, one or more visuals, one or more data views, and one or more data sources which are to be part of the customized visualization;
obtaining, via the first processing device from the data center, resource data from the one or more data sources, the resource data being associated with one or more of the storage, compute and networking resources of the data center;
creating, via the first processing device, the one or more data views utilizing the resource data, each data view comprising a dynamic mapping of the resource data based on the visualization requirements;
rendering, via the first processing device, the one or more visuals utilizing the one or more data views; and
generating, via the first processing device, the customized visualization by organizing the visuals into the one or more dashboards of a graphical user interface accessible via the one or more user processing devices of the one or more users;
wherein the customized visualization is generated according to the hierarchical structure custom-defined by the one or more user processing devices using the topology generator;
wherein generating the specification of visualization requirements comprise utilizing a data store comprising:
a template library comprising one or more dashboard templates and one or more visual templates, the one or more visual templates comprising a visualization of resource mapping and topology in the data center;
a metadata store comprising one or more data source definitions, one or more data view definitions, one or more visual definitions and one or more dashboard definitions; and
an instance store comprising one or more data source instances, one or more data view materializations, one or more visual instances and one or more dashboard instances.

2. The method of claim 1, wherein the data center comprises a software-defined data center.

3. The method of claim 1, wherein:
generating the specification of visualization requirements comprise parsing one or more visualization queries to generate corresponding execution plans;
obtaining resource data comprises retrieving relevant data from the data store according to the execution plans; and
utilizing the retrieved data for rendering the one or more visuals and organizing the visuals in the dashboard.

4. The method of claim 1, further comprising at least one of:
utilizing an existing dashboard template from the template library to organize the visuals in at least one of the one or more dashboards; and
saving at least one of the dashboards as a new dashboard template in the template library.

5. The method of claim 1, wherein the one or more visualization templates further comprise one or more of:

a three-dimensional visualization of at least a portion of the data center having one or more floors populated with racks of servers hosting the storage, compute and networking resources of the data center; and a dynamic monitoring of power and temperature of storage, compute and networking resources in the data center.

6. The method of claim 1, wherein organizing the visuals in the one or more dashboards comprising utilizing a drag-and-drop tool of a user interface to configure a layout of a given one of the one or more dashboards and placement of visuals at different positions in the given dashboard.

7. The method of claim 1, wherein organizing the visuals in the one or more dashboards comprising utilizing an interactive tool to configure an appearance of a given one of the one or more dashboards by:
   sorting, hiding and revealing elements in the given dashboard;
   filtering elements in the given dashboard; and
   providing conditional formatting rules for elements of the given dashboard.

8. The method of claim 1, wherein the customized visualization comprises two or more dashboards, each of the two or more dashboards being associated with a different one of a plurality of tenants of the software-defined data center.

9. The method of claim 1, wherein the customized visualization comprises two or more dashboards, the two or more dashboards comprising a first dashboard for a system administrator of the data center and a second dashboard for a given one of a plurality of tenants of the data center.

10. The method of claim 1, wherein generating the specification of visualization requirements comprises utilizing a user interface to configure a plurality of visualization elements for a given one of the one or more dashboards, each visualization element comprising one or more interfaces for customizing its associated appearance and behavior.

11. The method of claim 10, wherein the one or more interfaces for a given one of the elements comprises:
   an interface allowing customization of one or more parameters associated with the given element;
   an interface permitting the given element to be shown or hidden in the given dashboard; and
   an interface for positioning the given element in a layout of the given dashboard.

12. The method of claim 11, wherein the parameters associated with the given element comprise:
   one or more data source parameters, the data source parameters comprising at least one of a data source definition, a data format and a specification of where to obtain resource data;
   one or more data view mapping rules; and
   one or more visual parameters, the visual parameters comprising at least one of visual type, visual axis, visual theme and a data source for a visual.

13. The method of claim 1, wherein the customized visualization comprises at least one dashboard showing resource utilization statistics for one or more of the storage, compute and networking resources of the data center utilized by a given one of a plurality of tenants of the data center.

14. The method of claim 1, wherein the customized visualization comprises at least one dashboard showing mapping relationships for one or more of the storage, compute and networking resources of the data center utilized by a given one of a plurality of tenants of the data center.

15. The method of claim 1, wherein the customized visualization comprises at least one dashboard showing monitoring results for selected ones of the one or more storage, compute and networking resources of the data center utilized by a given one of a plurality of tenants of the data center.

16. The method of claim 1, wherein the customized visualization comprises at least one dashboard showing mapping relationships between one or more of the storage, compute and networking resources of the data center and a plurality of tenants of the data center.

17. The method of claim 1, wherein the user interface provides the topology generation tool which the user utilizes to create the hierarchical tree structure for the customized visualization according to the individual visualization requirements of a given user.

18. An article of manufacture comprising a processor-readable non-transitory storage medium having encoded therein executable code of one or more software programs, wherein the one or more software programs execute:
   in a computing environment comprising a data center operatively coupled to a first processing device, and one or more user processing devices operatively coupled to the first processing device;
   to generate, via the first processing device, a specification of visualization requirements for a customized visualization associated with one or more storage, compute and networking resources of the data center, wherein the specification generation step further comprises the first processing device receiving from the one or more user processing devices visualization requirements specific to each of one of more users for a given customized visualization, and further wherein the generation of visualization requirements comprises enabling use of a topology generator by at least one of the one or more user processing devices through a user interface associated with the first processing device to generate a user-definable hierarchical structure representing a topology of one or more dashboards, one or more visuals, one or more data views, and one or more data sources which are to be part of the customized visualization;
   to obtain, via the first processing device from the data center, resource data from the one or more data sources, the resource data being associated with one or more of the storage, compute and networking resources of the data center;
   to create, via the first processing device, the one or more data views utilizing the resource data, each data view comprising a dynamic mapping of the resource data based on the visualization requirements;
   to render, via the first processing device, the one or more visuals utilizing the one or more data views; and
   to generate, via the first processing device, the customized visualization by organizing the visuals into the one or more dashboards of a graphical user interface accessible via the one or more user processing devices of the one or more users;
   wherein the customized visualization is generated according to the hierarchical structure custom-defined by the one or more user processing devices using the topology generator;
   wherein generating the specification of visualization requirements comprise utilizing a data store comprising:
      a template library comprising one or more dashboard templates and one or more visual templates, the one or more visual templates comprising a visualization of resource mapping and topology in the data center;

a metadata store comprising one or more data source definitions, one or more data view definitions, one or more visual definitions and one or more dashboard definitions; and an instance store comprising one or more data source instances, one or more data view materializations, one or more visual instances and one or more dashboard instances.

19. An apparatus comprising:

in a computing environment comprising a data center operatively coupled to a first processing device, and one or more user processing devices operatively coupled to the first processing device;

a memory; and a processor operatively coupled to the memory and configured to implement the first computing device and;

to generate, via the first processing device, a specification of visualization requirements for a customized visualization associated with one or more storage, compute and networking resources of the data center, wherein the specification generation step further comprises the first processing device receiving from the one or more user processing devices visualization requirements specific to each of one of more users for a given customized visualization, and further wherein the generation of visualization requirements comprises enabling use of a topology generator by at least one of the one or more user processing devices through a user interface associated with the first processing device to generate a user-definable hierarchical structure representing a topology of one or more dashboards, one or more visuals, one or more data views, and one or more data sources which are to be part of the customized visualization;

to obtain, via the first processing device from the data center, resource data from the one or more data sources, the resource data being associated with one or more of the storage, compute and networking resources of the data center;

to create, via the first processing device, the one or more data views utilizing the resource data, each data view comprising a dynamic mapping of the resource data based on the visualization requirements;

to render, via the first processing device, the one or more visuals utilizing the one or more data views; and to generate, via the first processing device, the customized visualization by organizing the visuals into the one or more dashboards of a graphical user interface accessible via the one or more user processing devices of the one or more users;

wherein the customized visualization is generated according to the hierarchical structure custom-defined by the one or more user processing devices using the topology generator;

wherein generating the specification of visualization requirements comprise utilizing a data store comprising:

a template library comprising one or more dashboard templates and one or more visual templates, the one or more visual templates comprising a visualization of resource mapping and topology in the data center;

a metadata store comprising one or more data source definitions, one or more data view definitions, one or more visual definitions and one or more dashboard definitions; and an instance store comprising one or more data source instances, one or more data view materializations, one or more visual instances and one or more dashboard instances.

* * * * *